Patented Jan. 16, 1940

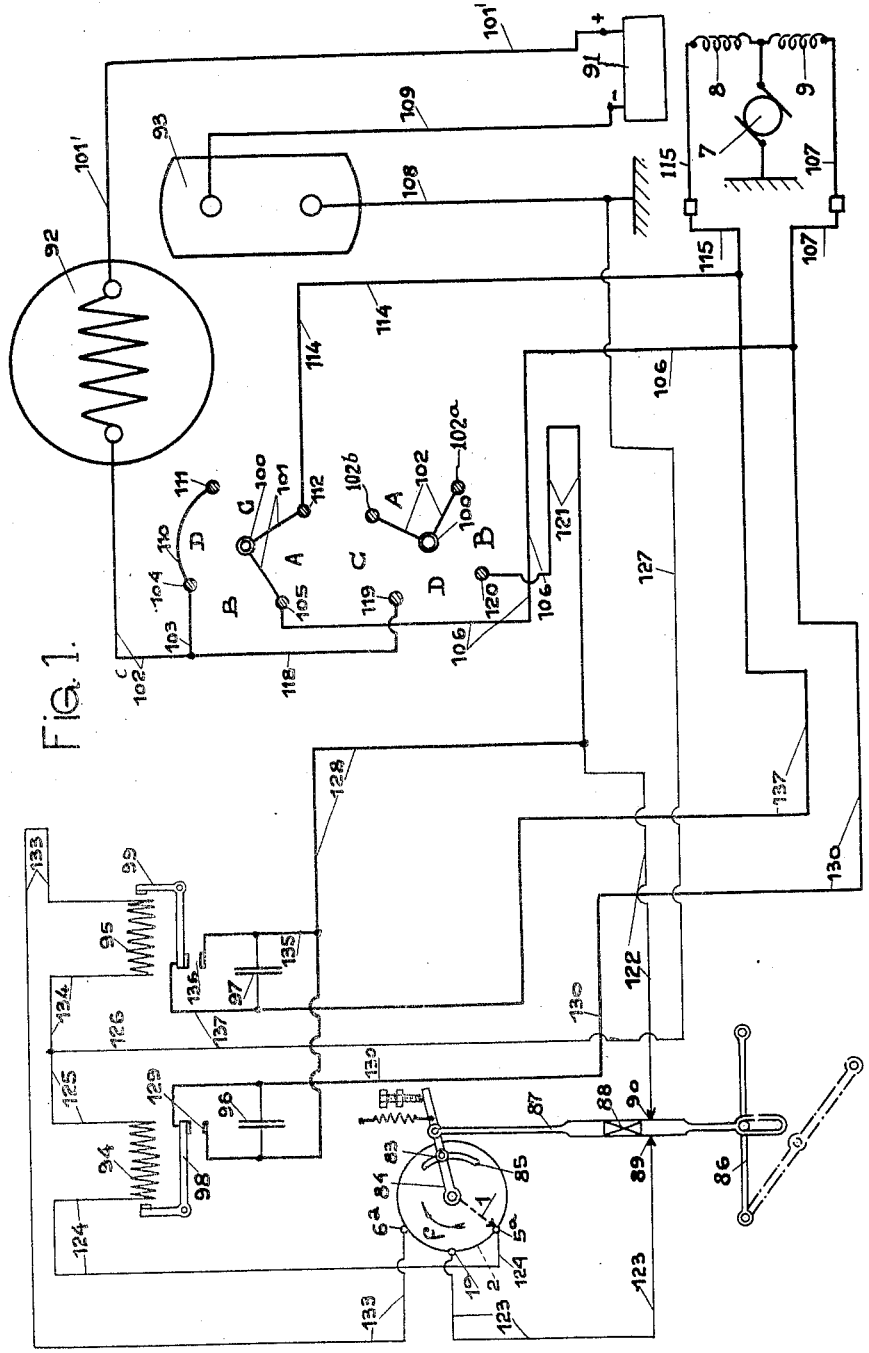

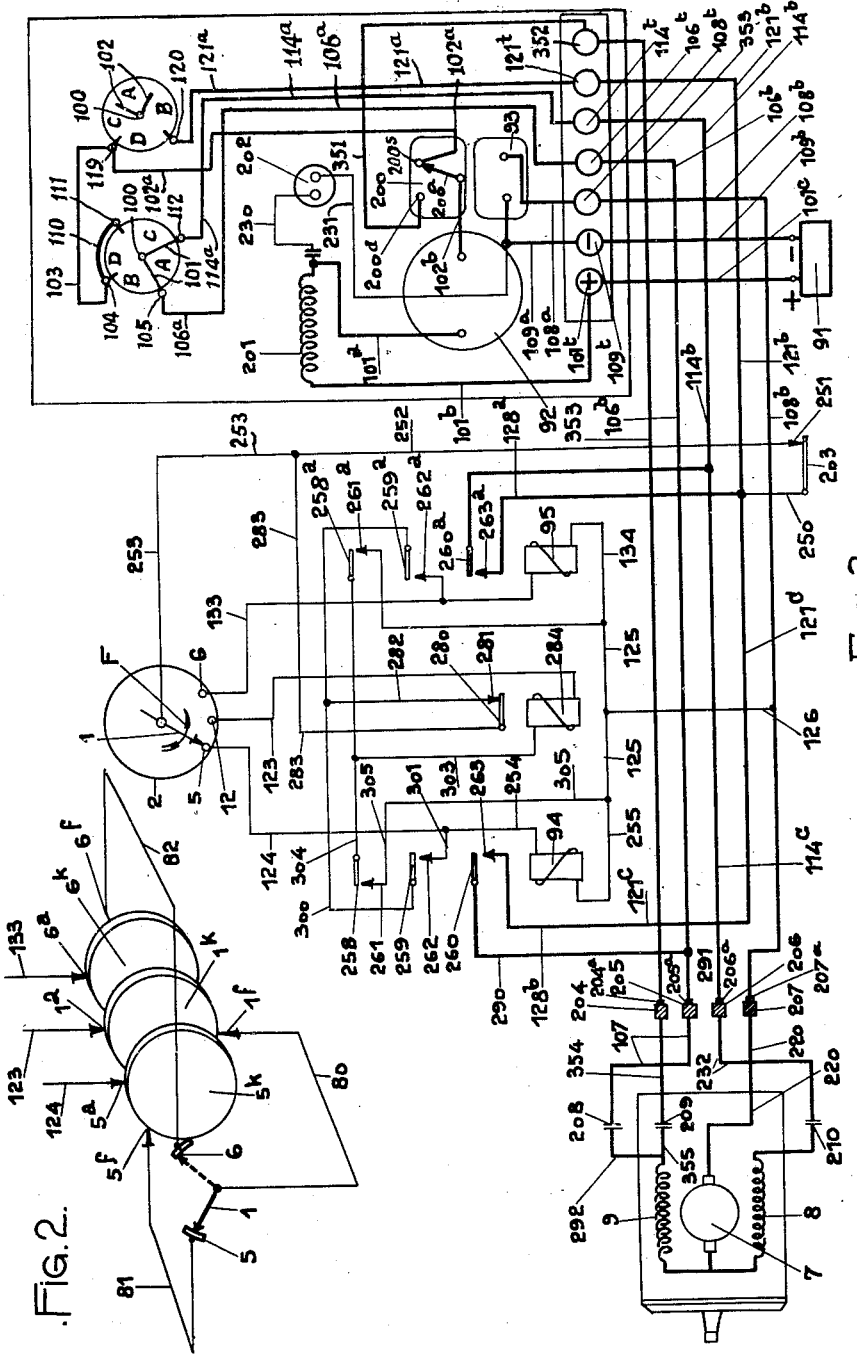

2,187,364

UNITED STATES PATENT OFFICE 2,187,364

VARIABLE PITCH AIRSCREW

Pierre Paul Ratié, Montrouge, France, assignor, by mesne assignments, to Paulin Jean Pierre Ratié, Montrouge (Seine), France Application November 5, 1936, Serial No. 109,318
In France April 1, 1936

1 Claim. (Cl. 172—239)

This invention relates to a variable pitch airscrew the change of pitch of which is controlled by a motor, for instance an electric motor, and is automatically determined by the variations of the speed of rotation of the airscrew.

The said variable pitch airscrew according to the invention is then in the form of a combination of a variable pitch airscrew, of a motor for modifying the pitch, of a tachometer or the like, and of a switching system, placed under the control of the tachometer, for controlling in its turn the operation of the motor modifying the pitch.

The switching system is so devised that, when the number of revolutions per minute of the motor exceeds a certain value, the airscrew is moved towards the highest pitch position, and so that, when the number of revolutions falls below another value (smaller than the preceding one), the airscrew is moved towards the lowest pitch position. These two values and their difference must preferably be adjustable at the pilot's desire.

The contacts or the like, controlled by the tachometer and which ensure the closing of the circuits for causing the motor to rotate in one direction or the other, in order to move the blades towards the lower pitch or higher pitch positions, can be adjusted in position, and said adjustment can be automatically effected by the position of the throttle control lever.

The installation comprises a four-position control switch, which positions respectively correspond: the first to the opening of the various circuits, the second to the operation under the control of the regulator such as a tachometer, the third and the fourth to the closing of the circuits for moving the blades towards the higher pitch and lower pitch positions.

The accompanying drawings illustrate, by way of example only, forms of carrying the invention into practice.

Fig. 1 is a diagrammatic view of a first form of construction.

Fig. 2 is a diagrammatic perspective view of the regulator of Fig. 1.

Fig. 3 is a diagrammatic view of a second form of construction.

In the drawings, the blades of the airscrew have not been illustrated. The tachometer (or similar instrument) has only been shown in a purely diagrammatic manner because the constitution of the tachometer does not concern the features of the present invention. It is to be understood that by the term "tachometer" is meant any device measuring or indicating the speed of rotation of the engine.

In the example illustrated in Figs. 1 and 2, the tachometer is represented by a pointer or index $1$ which moves opposite a dial $2$. The pointer is connected (see Fig. 2), through the medium of a wire $80$ and of a brush $1^f$, to a conducting drum $1^k$ on which also rubs a brush $1^a$. Contacts $5$ and $6$ for respectively controlling the lower pitch and higher pitch are respectively connected to conducting drums $5^k$ and $6^k$, for contact $5$, by a wire $81$ and a brush $5^f$, and, for contact $6$, by a wire $82$ and a brush $6^f$. Two brushes $5^a$ and $6^a$ rub on the conducting drums $5^k$ and $6^k$.

The unit, constituted by the contacts $5$, $6$ and drums $5^k$, $1^k$, $6^k$, is arranged on a tubular shaft surrounding the shaft of the index $1$, and can be adjusted in position through the medium of an arm $84$ fixed on the tubular shaft; on said arm $84$ is fixed a finger $83$ entering an arcuate opening $85$ provided in the dial $2$. The arm $84$ can be moved by the pilot, or its displacement can be directly effected, as shown in Fig. 1 through the medium of the throttle control lever $86$. For that purpose, the arm $84$ and the throttle control lever $86$ are connected by a link $87$ carrying a contact piece $88$ capable of engaging, in throttle opening position, between the contacts $89$ and $90$.

The installation comprises a series motor $7$ having two field windings $8$ and $9$ and thus capable of rotating in both directions according as winding $8$ or winding $9$ is fed with electric current. Moreover, use is made of a battery $91$, an ammeter $92$, a master switch $93$, an electromagnet $94$ or lower pitch relay, an electromagnet $95$ or higher pitch relay, and condensers $96$ and $97$ for avoiding sparks at the terminals of rockers $98$ and $99$ actuated by the electromagnets $94$ and $95$. Moreover, the installation is controlled, generally speaking, by a four position controller $100$ having two series of conducting blades $101$ and $102$ mounted on the same shaft of the controller. Each series of conducting blades $101$ or $102$ has two blades arranged perpendicularly to each other. In the position A of the controller, as shown in Figure 1, in which the blade $101$ connects the contacts $105$ and $112$, while blade $102$ connects the contacts $102^a$ and $102^b$, all the circuits are open; it is the stoppage position. In the position B, the blade $101$ connects the contacts $104$ and $105$, and the blade $102$ connects the contacts $102^a$ and $120$. In such a position of the controller $100$, the blades of the airscrew are caused to move towards the higher pitch position. In the position C, the blade $101$ connects the contacts $111$ and 112 while blade 102 connects the contacts 119 and 102ᵇ. In such a position, the blades of the airscrew are caused to move towards the lower pitch position. In the position D, the blade 101 connects the contacts 104 and 111, while the blade 102 connects the contacts 119 and 120; in such a position of the controller 100 the control is automatically effected by the regulator (Figure 2).

*Position B of the controller 100*

In this position, the closing of the following circuit is obtained: positive pole of battery 91, wire 101¹, ammeter 92, wire 102ᶜ, wire 103, contact piece 104, blade 101, contact piece 105, wire 106, wire 107, field winding 9, motor 7, earth, wire 108, master switch 93, wire 109, negative pole of battery 91. The motor rotates in the direction which causes the blades of the airscrew to be moved towards the higher pitch position.

*Position C of the controller 100*

In this position, the closing of the following circuit is obtained: positive pole of battery 91, wire 101¹, ammeter 92, wire 102ᶜ, wire 103, contact piece 104, wire 110, contact piece 111, blade 101, contact piece 112, wire 114, wire 115, field winding 8, motor 7, earth, wire 108, master switch 93, wire 109, negative pole of battery 91. The motor rotates in the direction which causes the blades to be moved towards the lower pitch position.

*Position D of the controller 100*

In this position, the operation is automatic and, accordingly as the index 1 engages with contact 5 or contact 6, the blades move towards the lower pitch position or the higher pitch position.

When the index 1 engages with contact 5, the closing of the following circuit is obtained: positive pole of battery 91, wire 101¹, ammeter 92, wire 102, wire 118, contact piece 119, blade 102, contact piece 120, wire 121, wire 122, contact 90, contact piece 88, contact 89, wire 123, brush 1ᵃ (Fig. 2), drum 1ᵏ, brush 1ᶠ, wire 80, index 1, contact piece 5, wire 81, brush 5ᶠ, drum 5ᵏ, brush 5ᵃ, wire 124, electromagnet 94, wire 125, wire 126, wire 127, wire 108, master switch 93, wire 109, negative pole of battery 91.

The electromagnet 94 is energized and actuates the rocker 98 which closes the following circuit: positive pole of battery 91, wire 101¹, ammeter 92, wire 102ᶜ, wire 118, contact piece 119, blade 102, contact piece 120, wire 121, wire 128, contacts 129, wire 130, wire 107, field winding 9, motor 7, earth, wire 108, master switch 93, wire 109, negative pole of battery 91. The motor rotates in the direction which causes the blades of the airscrew to be moved towards the lower pitch position.

When the index 1 engages with contact 6, the closing of the following circuit is effected: positive pole of battery 91, wire 101¹, ammeter 92, wire 102, wire 118, contact piece 119, blade 102, contact piece 120, wire 121, wire 122, contact 90, contact piece 88, contact 89, wire 123, wiper 1ᵃ, drum 1ᵏ, wiper 1ᶠ, wire 80, index 1, contact 6, wire 82, wiper 6ᶠ, drum 6ᵏ, wiper 6ᵃ, wire 133, electromagnet 95, wire 134, wire 126, wire 127, wire 108, master switch 93, wire 109, negative pole of battery 91.

The electromagnet 95 is energized and actuates the rocker 99 which closes the following circuit: positive pole of the battery, wire 101¹, ammeter 92, wire 102, wire 118, contact piece 119, blade 102, contact piece 120, wire 121, wire 128, wire 135, contacts 136, wire 137, wire 115, field winding 8, motor 7, earth, wire 108, master switch 93, wire 109, negative pole of battery 91. The motor rotates in the direction which causes the blades of the airscrew to be moved towards the higher pitch position.

Fig. 3 illustrates a constructional modification of the diagrammatic view of Fig. 1. In this modification, use is made of a primary controller 200 the control arm 200ᵃ of which can be placed, either on the contact piece 200ˢ for putting the installation in service conditions, or on the contact piece 200ᵈ for placing the blades of the airscrew in the wind's eye position, that is to say for placing the blades of the airscrew in planes substantially parallel to the longitudinal axis of the airplane. Moreover, in this modification, an intensity relay 201 for a lamp and a lamp 202 are provided. Furthermore, the installation comprises a switch 203 and the collector rings, interposed between the fixed part of the installation and the motor 7 controlling the variations of the pitch of the airscrew, which motor is mounted on the hub of the airscrew, are diagrammatically indicated at 204 (circuit for the wind's eye position), 205 (circuit of the small pitch), 206 (circuit of the large pitch), 207 (common circuit).

The arm 200ᵃ of the primary controller being placed on the service contact piece 200ˢ, the blades 101 and 102 of the controller 100 can be placed in the various positions A, B, C, and D.

*Position A of controller 100*

In this position, illustrated in Fig. 3, all the circuits are open, the installation is then in stoppage position.

*Position B of controller 100*

In this position, the closing of the following circuit is obtained: positive pole of the battery 91, wire 101ᶜ, contact piece 101ᵗ, wire 101ᵇ, relay 201, wire 101ᵃ, ammeter 92, wire 102ᵇ, arm 200ᵃ, contact 200ˢ, wire 102ᵃ, contact 119, wire 103, contact 104, blades 101, contact 105, wire 106ᵃ, contact piece 106ᵗ, wires 106ᵇ and 291, ring 205, wire 107, contact breaker 208, wire 292, field winding 9, motor 7, wire 220, ring 207, wire 108ᵇ, contact piece 108ᵗ, wire 108ᵃ, master switch 93, wire 109ᵃ, contact piece 109ᵗ, wire 109ᵇ, negative pole of the battery 91. The motor rotates in the direction causing displacement of the blades towards the higher pitch position.

It will be noted that the circuit of the operation signalling lamp 202 is closed between relay 201 and wire 109ᵃ through: wire 230, lamp 202 and wire 231.

*Position C of controller 100*

In this position, the closing of the following circuit is obtained: positive pole of the battery 91, wire 101ᶜ, contact piece 101ᵗ, wire 101ᵇ, relay 201, wire 101ᵃ, ammeter 92, wire 102ᵇ, arm 200ᵃ, contact 200ˢ, wire 102ᵃ, contact 119, wire 103, contact 104, wire 110, contact 111, blade 101, contact 112, wire 114ᵃ, contact piece 114ᵗ, wires 114ᵇ, 114ᶜ, ring 206, wire 232, contact breaker 210, field winding 8, motor 7, wire 220, ring 207, wire 108ᵇ, contact piece 108ᵗ, wire 108ᵃ, master switch 93, wire 109ᵃ, contact 109ᵗ, wire 109ᵇ, negative pole of battery 91. The motor rotates in the direction causing displacement of the blades towards the lower pitch position.

As in the position B, the circuit of the signalling lamp 202 is closed.

Position D of controller 100

In this position, the operation is automatic and, accordingly as the index 1 comes against contact 5, or contact 6, the blades move towards the higher pitch position, or towards the lower pitch position.

The contacts 258, 259 and 260, controlled by the armature of the electromagnet 94, as well as the contacts 258ª, 259ª and 260ª controlled by the armature of the electromagnet 95 are normally open when the electromagnets are unenergized. On the contrary the contact 280, controlled by the armature of the electromagnet 284, is normally closed when the electromagnet 284 is unenergized.

When the index 1 comes against contact 5, the closing of the following circuit is obtained: positive pole of battery 91, wire 101ᶜ, contact piece 101ᵗ, wire 101ᵇ, relay 201, wire 101ª, ammeter 92, wire 102ᵇ, arm 200ª, contact 200ˢ, wire 102ª, contact 119, blade 102, contact 120, wire 121ª, contact piece 121ᵗ, wire 121ᵇ, wire 250, limit switch 203, contact 251, wire 252, wire 253, index 1 of the regulator, contact 5, wire 124, wire 254, electromagnet 94, wires 255, 125, 126, 108ᵇ, contact piece 108ᵗ, master switch 93, wire 109ª, contact piece 109ᵗ, wire 109ᵇ, negative pole of battery 91.

The electromagnet 94 is energized and actuates the contacts 258, 259, 260 for applying them against fixed contacts 261, 262 and 263, respectively, this causing the closing of the following circuits:

(a) positive pole of battery 91, wire 101ᶜ, contact piece 101ᵗ, wire 101ᵇ, relay 201, wire 101ª, ammeter 92, wire 102ᵇ, arm 200ª, contact 200ˢ, wire 102ª, contact 119, blade 102, contact 120, wire 121ª, contact piece 121ᵗ, wire 121ᵇ, wire 121ᶜ, contacts 263 and 260, wire 290, wire 291, ring 205, wire 107, contact breaker 208, wire 292, field winding 9, motor 7, wire 220, ring 207, wire 108ᵇ, contact piece 108ᵗ, master switch 93, wire 109ª, contact piece 109ᵗ, wire 109ᵇ, negative pole of battery 91. The motor rotates in the direction causing displacement of the blades towards the higher pitch position. The index 1 tends to move in the direction of the arrow F, by opening the initial circuit of electromagnet 94 at contact 5, but the following holding circuit has been closed:

(b) positive pole of battery 91, wire 101ᶜ, contact piece 101ᵗ, wire 101ᵇ, relay 201, wire 101ª, ammeter 92, wire 102ᵇ, arm 200ª, contact 200ˢ, wire 102ª, contact 119, blade 102, contact 120, wire 121ª, contact piece 121ᵗ, wire 121ᵇ, wire 250, limit switch 203, contact 251, wire 252, wire 283, contacts 280 and 281, wires 282, 300, pallet 259, contact 262, wires 301, 254, electromagnet 94, wires 255, 125, 126, 108ᵇ, contact piece 108ᵗ, master switch 93, wire 109ª, contact piece 109ᵗ, wire 109ᵇ, negative pole of battery 91.

The electromagnet 94 is maintained energized until the contact index 1 comes opposite contact piece 12, this causing the closing of the following circuit:

(c) positive pole of battery 91, wire 101ᶜ, contact piece 101ᵗ, wire 101ᵇ, relay 201, wire 101ª, ammeter 92, wire 102ᵇ, arm 200ª, contact 200ˢ, wire 102ª, contact 119, blade 102, contact 120, wire 121ª, contact piece 121ᵗ, wire 121ᵇ, wire 250, limit switch 203, wire 252, wire 253, index 1, contact piece 12, wire 123, electromagnet 284, wire 303, wire 304, contacts 258 and 261, wire 305, wire 125, wire 126, wire 108ᵇ, contact piece 108ᵗ, master switch 93, wire 109ª, contact piece 109ᵗ, wire 109ᵇ, negative pole of battery 91.

The electromagnet 284 is energized and attracts the contact 280 by opening the circuit (b) at contact 281. The circuit of electromagnet 94 is opened and the circuit (a) is opened at contact 263.

The operation is similar in case index 1 has engaged with contact 6 for controlling the displacement of the blades towards the lower pitch position, the circuits including in this case the electromagnets 95 and 284 and the contacts 280, 281, on the one hand, and 258ª and 259ª, 260ª and 261ª, 262ª and 263ª, on the other hand.

For moving the blades to the wind's eye position, the arm 200ª is placed on contact 200ᵈ and the following circuit is closed:

Positive pole of battery 91, wire 101ᶜ, contact piece 101ᵗ, wire 101ᵇ, relay 201, wire 101ª, ammeter 92, wire 102ᵇ, arm 200ª, contact piece 200ᵈ, wire 351, contact piece 352, wire 353, ring 204, wire 354, contact breaker 209, wire 355, field winding 9, motor 7, wire 200, ring 207, wire 108ᵇ, contact piece 108ᵗ, master switch 93, wire 109ª, contact piece 109ᵗ, wire 109ᵇ, negative pole of battery 91.

The limit switches 208—209—210 are each of the well known type comprising a movable contact 208a—209a—210a actuated by a finger belonging to the slide-block 434 which will be described in reference to Figs. 4 and 5. The said limit-switches have for their object to break the circuit of the motor 7 when the blades of the airscrew have attained either the lowest or the highest pitch position, or the wind's eye position.

What I claim as my invention and desire to secure by Letters Patent is:

In an electric motor control system, a source of electric energy having two terminals, an electric motor having two field circuits, each of said two field circuits corresponding to a different direction of rotation of said motor, a receiving device, means for transmitting to the receiving device the rotary motion of the motor, a switch having two exterior fixed contacts and a central fixed contact, and a movable contact, arranged to cooperate with the three fixed contacts and connected to the first of the terminals of the source of electric energy, means responsive to the variations of position of the receiving device for displacing said movable contact, a first relay connected on the one hand to the second terminal of the source of electric energy and on the other hand to the first of the two exterior fixed contacts of the switch, a second relay connected on the one hand to the second terminal of the source of electric energy and on the other hand to the second of the two exterior fixed contacts of the switch, a holding circuit for each of said relays, a deenergizing circuit, each relay including a working contact arranged in the holding circuit thereof, a working contact arranged in the deenergizing circuit, a working contact also arranged in one of the two field circuits of the motor, and a third relay arranged in the deenergizing circuit and connected on the one hand to the second terminal of the source of electric energy and on the other hand to the central fixed contact of the switch, said relay comprising a contact of rest arranged in the holding circuit of each of the first and second relays.

PIERRE PAUL RATIÉ.